UNITED STATES PATENT OFFICE.

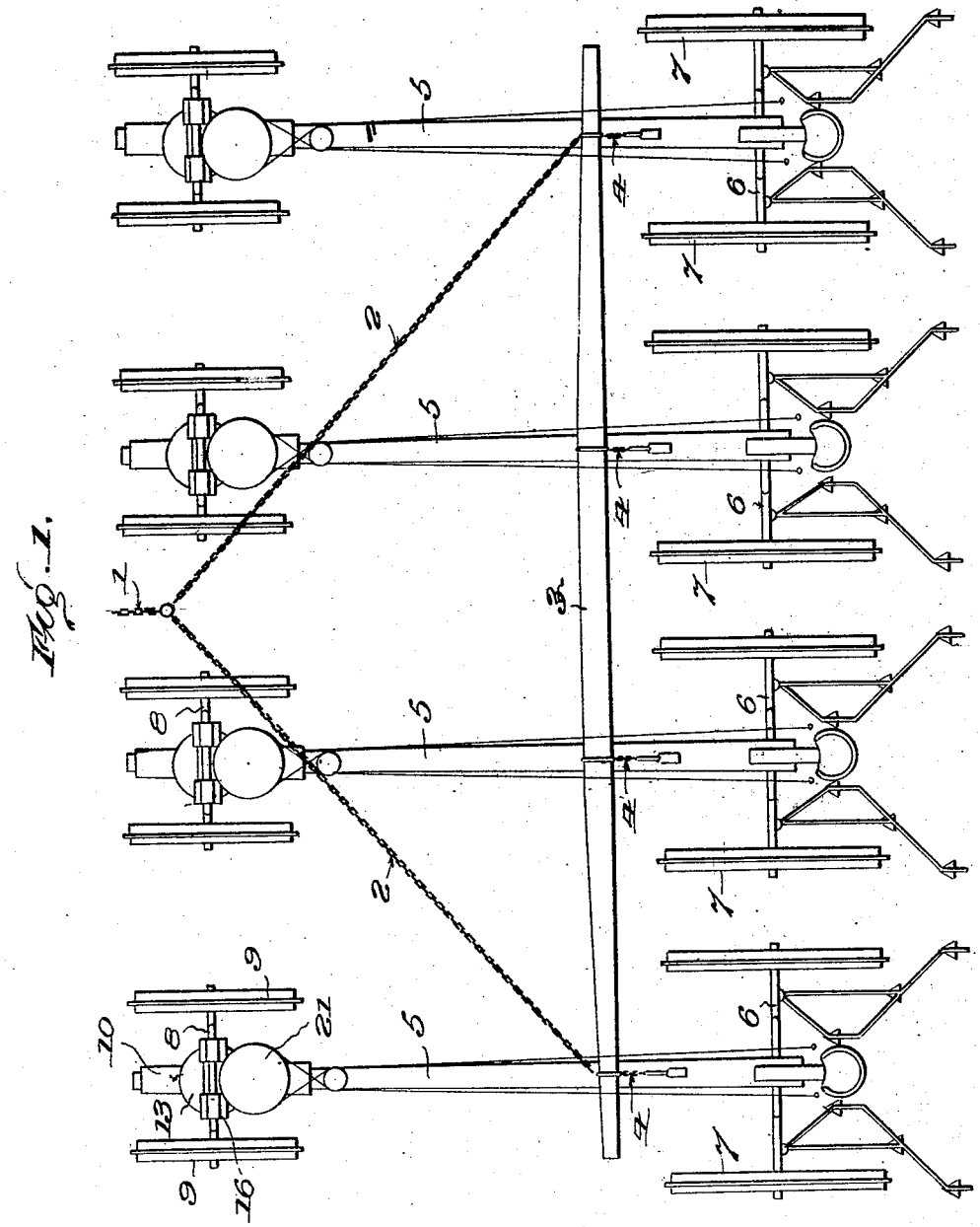

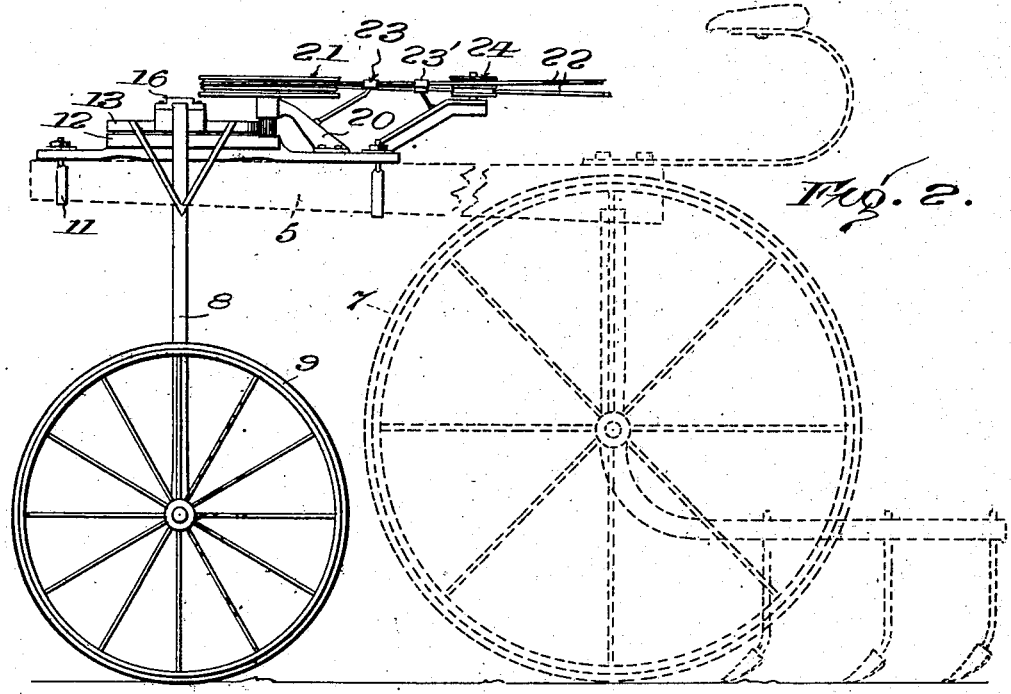
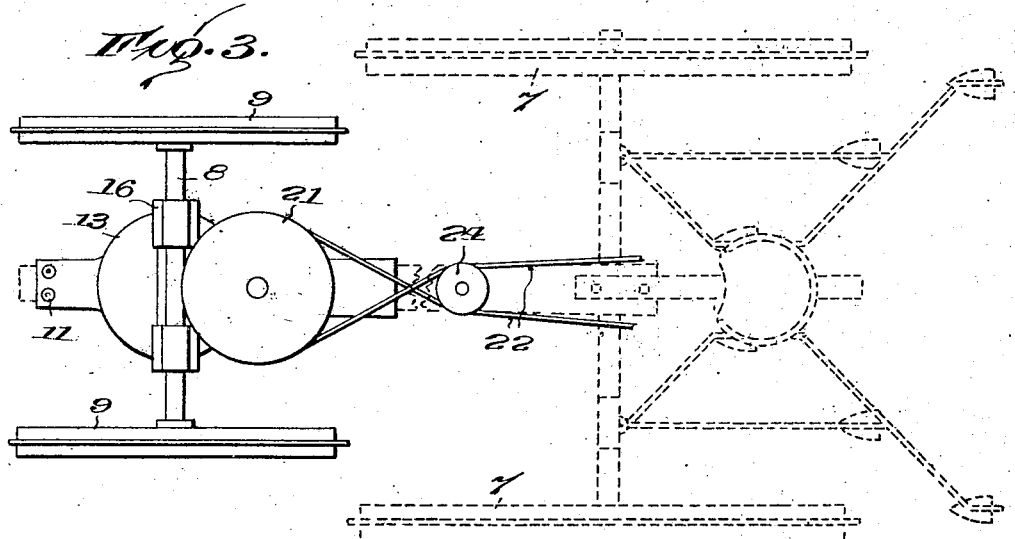

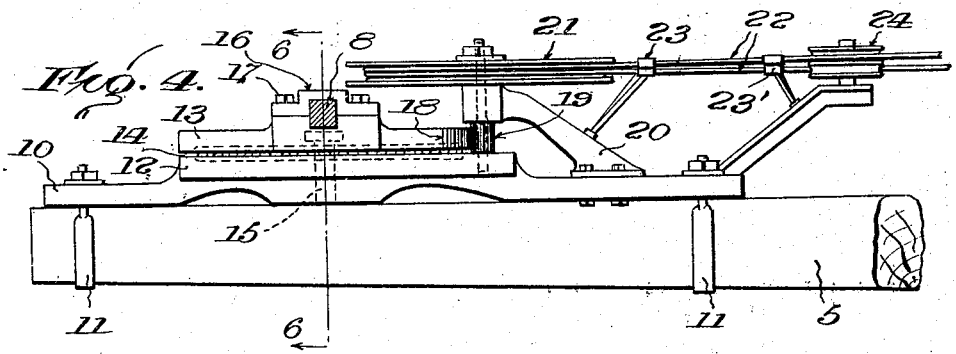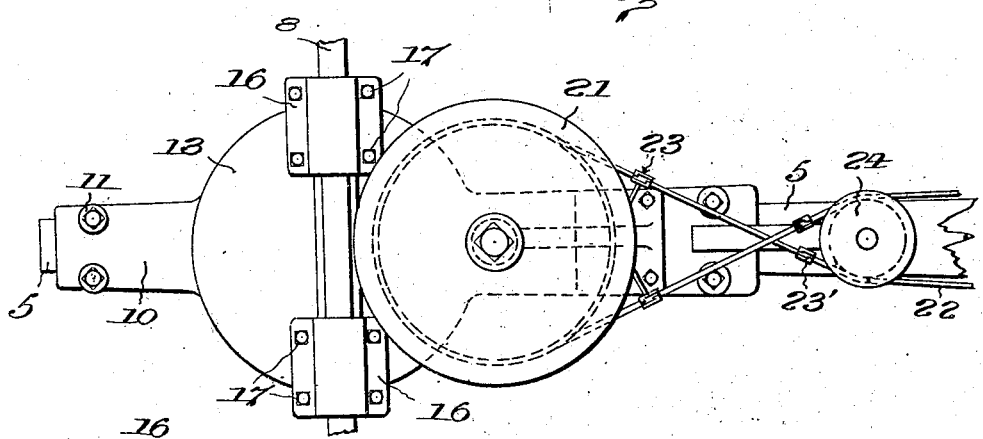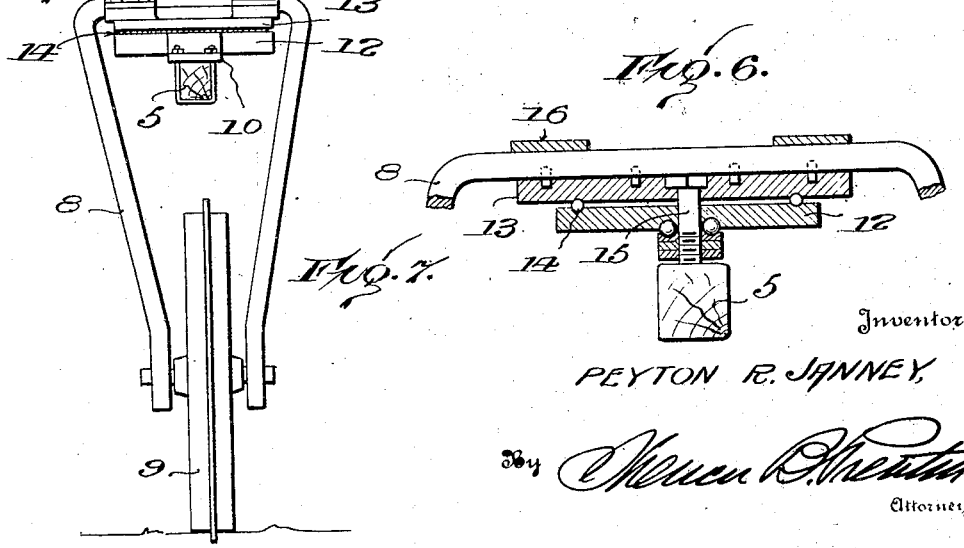

PEYTON R. JANNEY, OF DETROIT, MICHIGAN.

DETACHABLE STEERING DEVICE.

1,327,829.     Specification of Letters Patent.     Patented Jan. 13, 1920.

Application filed October 20, 1917, Serial No. 197,603. Renewed October 7, 1919. Serial No. 329,082.

*To all whom it may concern:*

Be it known that I, PEYTON R. JANNEY, a citizen of the United States, residing at Detroit, in the county of Wayne and State of Michigan, have invented new and useful Improvements in Detachable Steering Devices, of which the following is a specification.

This invention relates to gang cultivators and gang plows in general and has to do in particular with the mechanism to be used in steering the individual units. One object of the invention is to provide a gang pull for cultivators in which the cultivator units are provided with mechanism making possible the control of each unit by the operator directing the same.

A further object of the invention is to provide a gang cultivator in which the cultivator units may be operated along the line parallel to but to one side of the direction taken by the tractor unit which may be used in pulling the gang.

A further object of the invention is to provide a cultivator which may be operated in a line parallel to but to one side of the direction taken by the tractor which may be used to pull the cultivator.

A further object of the invention is to provide a novel wheeled cultivator which may be steered by auxiliary wheeled attachment under the control of the operator of the cultivator.

Another object of the invention is to provide an attachment for cultivator tongues which may be readily attached to the tongue of any cultivator, plow, or binder, of present day use and which may be controlled from the seat of the cultivator or other implement to which a steering control may be attached.

Further features of the invention will be described in the following specification and claims and illustrated in the accompanying drawing in which Figure 1 represents a view of a gang cultivator embodying the use of the separately controlled cultivator units.

Fig. 2 represents a side view of one of the cultivator units.

Fig. 3 represents a top plan view of one of the cultivator units showing an enlarged view of the attachment of the bar for the fastening of the cultivator unit to the gang, and showing a top plan view of the steering mechanism at the forward end of the tongue.

Fig. 4 represents an enlarged view from the side of the mechanism used for steering the gang unit.

Fig. 5 represents an enlarged plan view of the same.

Fig. 6 represents a vertical section taken along the line 6—6 of Fig. 4.

Fig. 7 represents a modification of the steering device illustrating the use of a single wheel.

Like numerals refer to like parts throughout the figures of the drawings.

Referring to Fig. 1, 1 represents the connecting means from a tractor element used to pull the gang cultivator. 2 represents the divisions extending from 1 and being connected to a cross bar 3 to which the cultivator units of the gang are fastened by means of a chain 4. It will be observed that the bar 3 extends across the tongues 5 of a plurality of cultivator units. The chain 4 is fastened to the cross-bar 3 and extends from the latter to the bolt in the tongue used for pivotally mounting the usual double-tree. This chain should be of sufficient length, from six to fifteen inches, to permit movement of the tongue relative to the cross-bar as will be further described. The cultivator units are provided with the usual rear axle 6 and wheels 7. The axle should be provided with a substantial arch as is customary in cultivators used for corn. The tongue 5 extends forward substantially horizontally from the crest of the arch of the rear axle and is provided with the forward wheeled structure having the arched axle 8 and wheels 9. Extending rearwardly from the front end of the tongue 5 and along the top of the same is a turntable base 10 which is substantially the width of the tongue at either end of the base and is firmly fastened to the same by means of the clamping U-bolt members 11. Adjacent to the forward end of the base 10 that member is broadened out to provide a substantially circular base for the reception of the rotatable parts to be mounted above it. This broadened portion of the base is indicated by the numeral 12. Mounted above the enlarged portion 12 is a rotatable table 13 provided with suitable ball-bearings or roller-bearings 14. A king bolt 15 extends through the table 13 and is fastened on the under surface of the base 10. Extending laterally across the top of the table 13 and substantially over the center thereof is the upper arched portion of the front axle member 8. This portion of the member 8 is clamped to and firmly secured on the table 13 by means of the yokes 16 and their respective fastening bolts 17. On the rear edge of the table 13 there is provided the gear teeth 18 which are adapted to be engaged by the teeth of the pinion gear 19 as will be described. Extending forwardly from the base 10 and from the rear part thereof is a bracket member 20 arranged to provide an upper bearing for the pinion gear 19 and a support for a control wheel 21 which is mounted above the bracket 20. The lowermost end of the pinion gear has its bearing support in the base 10 and the wheel 21 is rigidly keyed to the other end of the shaft. A control rope or operating cable 22 is fastened about the wheel 21 and extends through the guide eyelets 23 and 23' on either side thereof and rearwardly therefrom. A guide wheel 24 is rotatably mounted on an extension from the base 10 and located between the ropes 22 to space them apart and prevent frictional wear against the eyelets 23'. The control ropes 22 extend back to the rear portion of the cultivator unit or the implement or vehicle being pulled so as to be readily accessible to the operator.

The control of the structure and management of the cultivator unit will be understood from the following explanation. The operator of the cultivator, if desiring to guide the machine to the right will pull on the proper rope 22 to turn the wheel 21 to the left. The pinion gear 19 being in mesh with the teeth 18 and rigidly keyed to the wheel 21 will operate to turn the table 13 to the right or clock-wise, thus rotating the table on the base 10 to steer the wheels 9.

Referring to the modification illustrated in Fig. 7 it will be noted that the operating mechanism illustrated is substantially the same but that there is one wheel instead of two. In this form the axle 8 extends downwardly to provide a forked member having at its lowermost ends the axle bearings for a wheel which is mounted thereon.

From the foregoing description and the accompanying drawings it will be clear that this invention provides an unusually adaptable type of structure of gang cultivator and also a simple and inexpensive form of front wheel and steering structure therefor. Changes in the relative location of the parts, relative proportion of the same and changes in the material to be used may be made without departing from the scope of the invention.

What I claim is:—

1. The combination with a wheeled implement and a tongue therefor, of a support and control for the forward end of the tongue comprising a wheeled structure, means for swively mounting said structure upon the tongue, a gear carried by said structure, a pinion engaging said gear, a control sheave coöperating with said pinion, and a flexible connection upon said control sheave and extending rearwardly to the operator upon the implement.

2. The combination with a wheeled implement and a tongue therefor, of a support and control for the forward end of the tongue comprising a wheeled structure, means for swively mounting said structure upon the tongue, a base supported by said means, a rotatable table mounted on said base, a gear carried by said table, a pinion engaging said gear, a control sheave coöperating with said pinion, and a flexible connection upon said control sheave and extending rearwardly to the operator upon the implement.

3. The combination with a wheeled implement and a tongue therefor, of a detachable support and control for the forward end of the tongue comprising a wheeled structure, means for detachably and swively mounting said structure upon the tongue, a gear carried by said structure, a pinion engaging said gear, a control sheave coöperating with said pinion, and a flexible connection upon said control sheave and extending to a point accessible to the operator of the implement.

4. The combination with a wheeled implement and a tongue therefor, of a self contained detachable support and control for the forward end of the tongue comprising a wheeled structure, means for detachably and swively mounting said structure upon the tongue, a gear carried by said structure, and control means mounted on said support and removable as a unit therewith for actuating said gear to turn said wheeled structure.

5. The combination with a wheeled implement and a tongue therefor, of a detachable support and control for the forward end of the tongue comprising a wheeled structure, means for swively and detachably mounting said structure upon said tongue, a base member detachably mounted on said tongue, a rotatable table mounted on said base, a gear carried by said table, a pinion engaging said gear, a control sheave coöperating with said pinion, and a flexible connection upon said control sheave extending to the operator.

6. The combination with a wheeled implement and a tongue therefor, of a detachable support and control for the forward end of the tongue comprising a wheeled structure, means for swivelly and detachably mounting said structure upon said tongue, a base member detachably mounted on said tongue, a rotatable table mounted on said base, connecting means for rigidly joining said rotatable table and said wheeled structure, and control means for directing the rotation of the table and the steering of the wheeled implement.

7. The combination with a wheeled implement and a tongue therefor, of a detachable support and control for the forward end of the tongue comprising a wheeled structure, means for swively and detachably mounting said structure upon said tongue, a base member detachably mounted on said tongue, a rotatable table mounted on said base, a gear carried by said table, a pinion engaging said gear, connecting means for rigidly joining said table and said wheeled structure, and means for actuating said pinion and gear to steer the wheeled implement.

8. The combination with a wheeled implement and a tongue therefor, of a detachable support and control for the forward end of the tongue comprising a wheeled structure means for detachably and swivelly mounting said structure upon the tongue, a gear carried by said structure, a pinion engaging said gear, said pinion having upper and lower axial extensions, a bracket mounted on said base and having an opening for the reception of said upper extension, and a control sheave mounted above said bracket on said upper axial extension for actuating said pinion and gear to steer the wheeled implement.

In testimony whereof I have hereunto set my hand.

PEYTON R. JANNEY.